US010263986B1

(12) United States Patent
Bucklew et al.

(10) Patent No.: US 10,263,986 B1
(45) Date of Patent: Apr. 16, 2019

(54) PRIVILEGE ELEVATION SYSTEM AND METHOD FOR DESKTOP ADMINISTRATION

(71) Applicant: Dell Software Inc., Aliso Viejo, CA (US)

(72) Inventors: Charles Brian Bucklew, Walkerton, IN (US); Alberto Rodriguez Aragones, Mairena del Aljarafe (ES)

(73) Assignee: Quest Software Inc., Aliso Viejo, CA (US)

(*) Notice: Subject to any disclaimer, the term of this patent is extended or adjusted under 35 U.S.C. 154(b) by 0 days.

(21) Appl. No.: 14/325,074

(22) Filed: Jul. 7, 2014

(51) Int. Cl.
*H04L 29/06* (2006.01)

(52) U.S. Cl.
CPC ............ *H04L 63/10* (2013.01); *H04L 63/105* (2013.01)

(58) Field of Classification Search
CPC ... H04L 63/20; H04L 63/102; H04L 63/0227; G06F 21/575; G06F 21/51; G06F 21/6218; G06F 21/604; G06F 2221/2141; G06F 2221/2149
See application file for complete search history.

(56) References Cited

U.S. PATENT DOCUMENTS

| | | | |
|---|---|---|---|
| 7,293,087 B2 | 11/2007 | Styles et al. | |
| 7,353,262 B2 | 4/2008 | Styles et al. | |
| 7,469,278 B2 | 12/2008 | Styles et al. | |
| 7,801,975 B2 | 9/2010 | Styles | |
| 7,814,460 B2 | 10/2010 | Bucklew et al. | |
| 7,912,929 B2 | 3/2011 | Styles | |
| 8,127,316 B1 | 2/2012 | Binotto et al. | |
| 8,429,649 B1 | 4/2013 | Feathergill et al. | |
| 8,442,960 B1* | 5/2013 | Meyer | H04L 67/14 707/694 |
| 8,650,578 B1 | 2/2014 | Binotto et al. | |
| 2006/0259763 A1* | 11/2006 | Cooperstein et al. | 713/166 |
| 2011/0154505 A1* | 6/2011 | Cowan et al. | 726/27 |
| 2012/0317083 A1* | 12/2012 | Saxena | G06F 21/62 707/692 |
| 2013/0139216 A1* | 5/2013 | Austin | G06F 21/12 726/1 |

* cited by examiner

*Primary Examiner* — John B King
*Assistant Examiner* — Arya Golriz
(74) *Attorney, Agent, or Firm* — Winstead PC

(57) ABSTRACT

In one embodiment, a method is executed by an information handling system comprising computer hardware. The method includes monitoring a desktop environment of a user for a desktop-administration event. The method further includes, responsive to a detected occurrence of the desktop-administration event, identifying at least one script-execution process to invoke. The at least one script-execution process executes at least one privilege-agnostic desktop-administration script. The method also includes determining whether the at least one script-execution process is designated for privilege elevation. Moreover, the method includes, responsive to a determination that the at least one script-execution process is designated for privilege elevation, injecting a security token of the at least one script-execution process with elevated privileges to yield a privilege-injected script-execution process. Also, the method includes invoking the privilege-injected script-execution process in the desktop environment so that the desktop-administration script executes as the user with the elevated privileges.

17 Claims, 3 Drawing Sheets

PRIVILEGE ELEVATION SYSTEM AND METHOD FOR DESKTOP ADMINISTRATION

BACKGROUND

Technical Field

The present disclosure relates generally to user management and more particularly, but not by way of limitation, to systems and methods for privilege injection.

History of Related Art

When managing a user's workspace, it is often beneficial to modify the user's environment in various ways. For example, it may be necessary to map drives, assign printers, etc. Some modifications, however, may require elevated privileges (e.g., administrative privileges). Many users may not have privileges sufficient for the modifications to be performed from within their environment.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is executed by an information handling system comprising computer hardware. The method includes monitoring a desktop environment of a user for a desktop-administration event. The method further includes, responsive to a detected occurrence of the desktop-administration event, identifying at least one script-execution process to invoke. The at least one script-execution process executes at least one privilege-agnostic desktop-administration script. The at least one privilege-agnostic desktop-administration script is designed to execute in coordination with the desktop-administration event. The method also includes determining whether the at least one script-execution process is designated for privilege elevation. Moreover, the method includes, responsive to a determination that the at least one script-execution process is designated for privilege elevation, injecting a security token of the at least one script-execution process with elevated privileges to yield a privilege-injected script-execution process. Also, the method includes invoking the privilege-injected script-execution process in the desktop environment so that the desktop-administration script executes as the user with the elevated privileges.

In one embodiment, an information handling system includes a processing unit, wherein the processing unit is operable to implement a method. The method includes monitoring a desktop environment of a user for a desktop-administration event. The method further includes, responsive to a detected occurrence of the desktop-administration event, identifying at least one script-execution process to invoke. The at least one script-execution process executes at least one privilege-agnostic desktop-administration script. The at least one privilege-agnostic desktop-administration script is designed to execute in coordination with the desktop-administration event. The method also includes determining whether the at least one script-execution process is designated for privilege elevation. Moreover, the method includes, responsive to a determination that the at least one script-execution process is designated for privilege elevation, injecting a security token of the at least one script-execution process with elevated privileges to yield a privilege-injected script-execution process. Also, the method includes invoking the privilege-injected script-execution process in the desktop environment so that the desktop-administration script executes as the user with the elevated privileges.

In one embodiment, a computer-program product includes a non-transitory computer-usable medium having computer-readable program code embodied therein. The computer-readable program code is adapted to be executed to implement a method. The method includes monitoring a desktop environment of a user for a desktop-administration event. The method further includes, responsive to a detected occurrence of the desktop-administration event, identifying at least one script-execution process to invoke. The at least one script-execution process executes at least one privilege-agnostic desktop-administration script. The at least one privilege-agnostic desktop-administration script is designed to execute in coordination with the desktop-administration event. The method also includes determining whether the at least one script-execution process is designated for privilege elevation. Moreover, the method includes, responsive to a determination that the at least one script-execution process is designated for privilege elevation, injecting a security token of the at least one script-execution process with elevated privileges to yield a privilege-injected script-execution process. Also, the method includes invoking the privilege-injected script-execution process in the desktop environment so that the desktop-administration script executes as the user with the elevated privileges.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
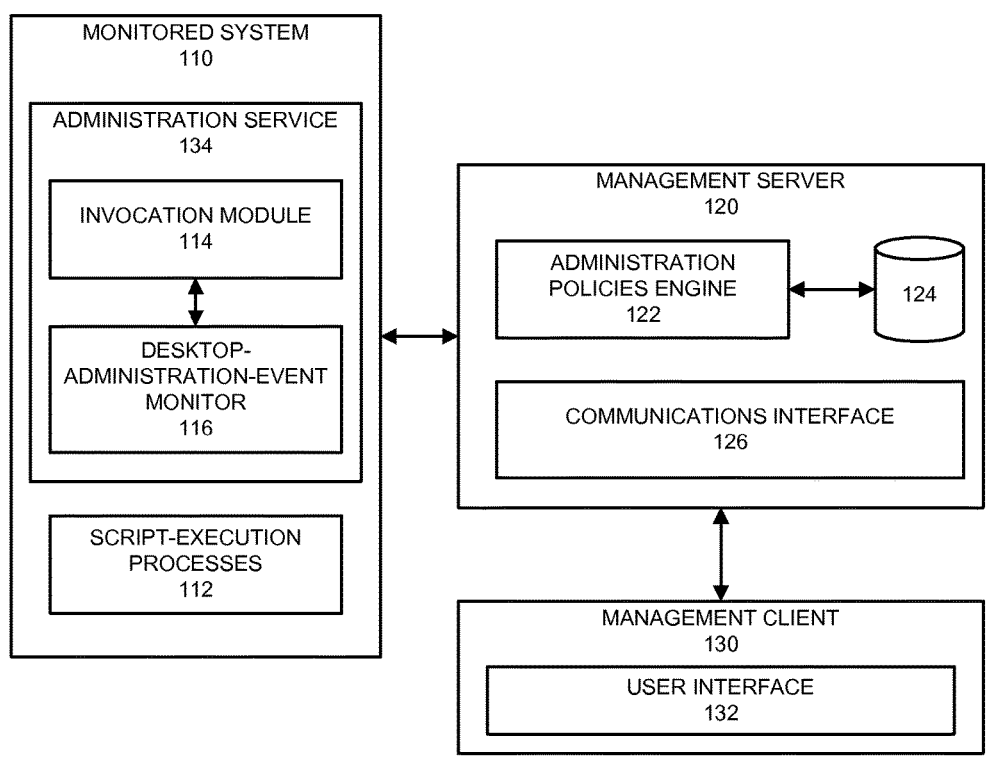
FIG. 1 illustrates an example of a system for performing desktop administration.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Administrators or other designated users may be responsible for managing desktop environments of numerous users in an enterprise or organization. Each desktop environment can include, for example, a bundle of programs running on top of a computer operating system, which share a common graphical user interface (GUI). As used herein, the term desktop environment includes virtual desktop environments.

For purposes of managing desktop environments, administrators, developers, and/or other designated users may write desktop-administration scripts intended to perform one or more desktop-administration tasks. Desktop-administration scripts may be, for example, a set of executables, commands, batch files, etc. Such desktop-administration scripts may be locally stored by a client information handling system and retrieved from a server that defines the resources, security, and configuration for each client. Desktop-administration tasks can include modifying configuration settings such as, for example, security policies, drive mappings, startup applications, registry settings, printer assignments, folder redirections, Internet settings, desktop shortcuts, proxy configurations, application paths, application settings, profiles, service packs, anti-virus updates, combinations of same, and/or the like. The desktop-administration scripts can be executed upon the occurrence of certain desktop-administration events such as, for example, startup, shutdown, logon, error message, application launch such as virus scan, period of user inactivity, a network connection or disconnection, a hardware message, and/or the like.

Many desktop-administration tasks may require privileges beyond what users are granted. For example, some or all of the desktop-administration tasks may require administrative privileges. One way to address this problem is to use a separate account with administrative privileges to perform the desktop-administration tasks (e.g., using a "run as" feature). However, in a distributed non-domain environment, there may not be a common user account available for all desktop environments. This can cause a logistical issue by requiring, for example, that potentially hundreds or thousands of different administrative credentials be provided or that hundreds or thousands of different desktop environments be modified to use shared credentials. In addition, developers who write desktop-administration scripts generally must have knowledge of the privilege-elevation mechanism so that the desktop-administration scripts can be invoked with the appropriate credentials.

Another way to address the above-described desktop-administration privileges problem is to perform the desktop-administration tasks in another application that executes as a higher-privileged user. Stated somewhat differently, the application executing the desktop-administration tasks is invoked in a separate remote user environment. With this approach, however, desktop-administration scripts cannot be written as the users whose desktop environments are being modified. Rather, knowledge of the privilege-elevation mechanism (i.e., the application executing in the separate remote user environment) is generally required. Thus, this approach can further complicate desktop administration.

The present disclosure describes various examples of automatically elevating privileges for certain privilege-agnostic desktop-administration scripts. In general, a desktop-administration script may be considered privilege agnostic if it is written without any accommodation for insufficient user privileges. In other words, a privilege-agnostic desktop-administration script is typically written as if the user in whose desktop environment the script is invoked has already been granted all necessary privileges, even though that may not be the case. Advantageously, in certain embodiments, the ability to write privilege-agnostic desktop-administration scripts can greatly simplify desktop administration for developers, administrators, and/or other users. In various embodiments described herein, for a given user, privilege-agnostic desktop-administration scripts can be executed as the given user, with automatically elevated privileges, in the given user's desktop environment.

FIG. 1 illustrates an example of a system 100 for performing desktop administration. In various embodiments, the system 100 facilitates execution of desktop-administration tasks upon detection of certain desktop-administration events. As illustrated, the system 100 includes a monitored system 110, a management server 120 in communication with the monitored system 110, and a management client 130 through which a user can interact with the management server 120.

Although only one monitored system 110 is shown, in some implementations, more than one monitored system 110 can be in communication with the management server 120. A group of monitored systems 110 could comprise, for instance, a group of user computers at an organization. A communication medium such as a network (not shown) can be provided as an interface between the management server 120 and the monitored system or systems 110.

The monitored system 110 is typically representative of a desktop environment of a user. The monitored system 110 can be, for example, an information handling system. More particularly, in certain embodiments, the monitored system 110 can be a client or user computer system. As shown, the monitored system 110 can include an administration service 134 resident thereon. As described in greater detail below, the administration service 134 can coordinate execution of desktop-administration tasks.

More particularly, the administration service 134 is shown to include an invocation module 114 and a desktop-administration-event monitor 116. In addition, one or more script-execution processes 112 can be provided with the administration service 134. The one or more script-execution processes 112 can each invoke one or more privilege-agnostic desktop-administration scripts as described above. The script-execution processes 112 can each be identified, for example, by a name of the process's executable, a file location where the executable is stored, command-line parameters to invoke the process, combinations of the same, and/or the like.

The desktop-administration-event monitor 116 can monitor the desktop environment of the monitored system 110 for particular desktop-administration events. In certain embodiments, the desktop-administration-event monitor 116 can trigger the invocation module 114 upon the occurrence of one of the particular desktop-administration events. Upon being triggered by the desktop-administration-event monitor 116, the invocation module 114 can determine which, if any, of the script-execution processes 112 should be invoked. In various implementations, the invocation module 114 can configurably elevate privileges of those of the script-execution processes 112 that are determined to be invoked. Further examples of the desktop-administration-event monitor 116 and the invocation module 114 will be described with respect to FIG. 2.

The management server 120 further includes an administration policies engine 122 and a data storage component 124. The administration policies engine 122 can maintain policies related to desktop-administration tasks. In various embodiments, information related to the maintained policies can be stored in the data storage component 124. In an example, the maintained policies can specify desktop-administration events monitored for by the desktop-administration-event monitor 116 (i.e., monitored desktop-administration events). In another example, the maintained policies can further specify which script-execution process(es) of the script-execution-processes 112 should be invoked for each monitored desktop-administration event. In yet another example, in certain embodiments, the administration policies engine 122 can further specify, for example, which, if any, of the script-execution processes 112 should be automatically granted elevated privileges.

In certain embodiments, the management client 130 can interface with the management server 120 using a network interface 126. In an embodiment, the management client 130 can be a computer operated by IT personnel, an administrator, a security officer, or the like. The management client 130 can include a user interface 132 and related programs for interacting with the management server 120. The user interface 132 can be used, for example, to specify or modify policies of the administration policies engine 122.

Figure 2:
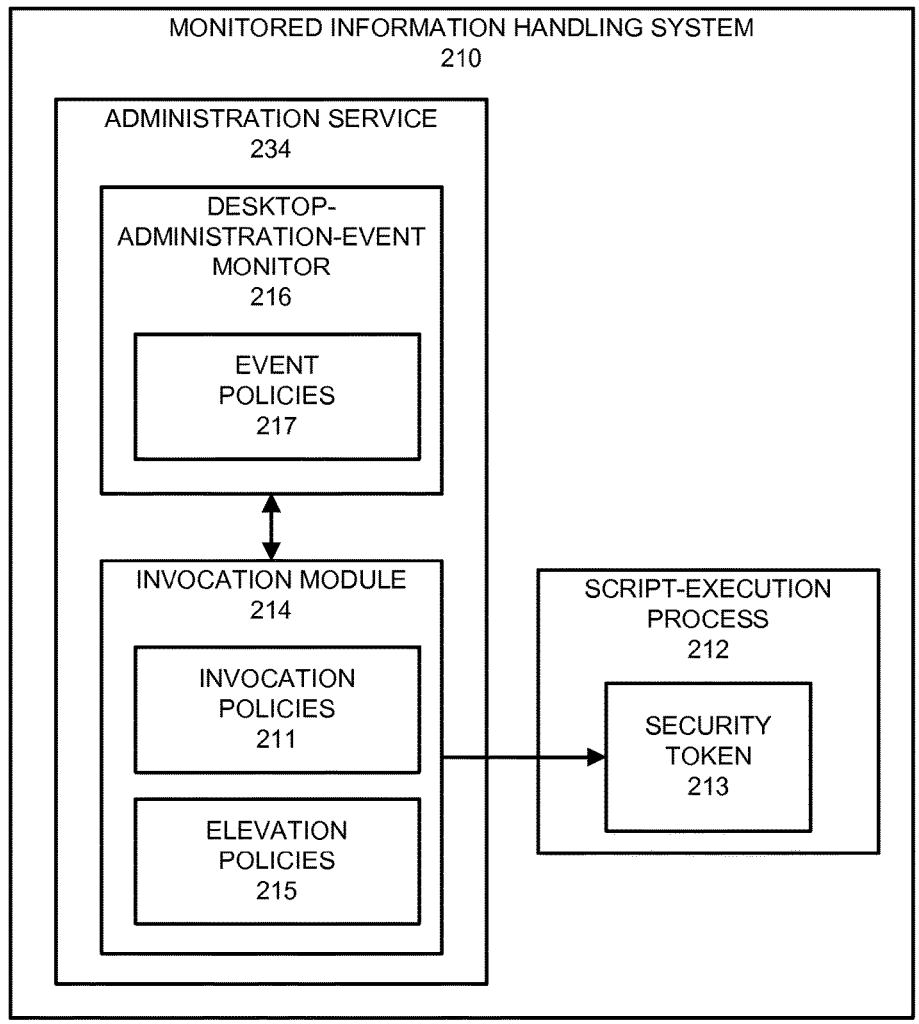
FIG. 2 illustrates an example monitored system.

FIG. 2 illustrates a more detailed embodiment of a monitored system 210. Like the components of the system 100, the components of the monitored system 210 can be implemented as software applications, modules, combinations of the same, and/or the like on one or more computer systems, such as information handling systems.

Certain modules or components from FIG. 1 have counterparts in the monitored system 210, including an administration service 234, a script-execution process 212, an invocation module 214, and an desktop-administration-event monitor 216. The administration service 234, the script-execution process 212, the invocation module 214, and the desktop-administration-event monitor 216 can have the same or substantially the same functionality described above with respect to FIG. 1. In addition, new modules or components are shown, including event policies 217, invocation policies 211, elevation policies 215, and a security or access token 213.

More specifically, the desktop-administration-event monitor 216 is shown to include the event policies 217. The invocation module 214 is shown to include the invocation policies 211 and the elevation policies 215. In certain embodiments, the event policies 217, the invocation policies 211, and the elevation policies 215 are set or otherwise controlled by the administration policies engine 122 of the management server 120 in the fashion described above with respect to FIG. 1. The event policies 217, the invocation policies 211, and the elevation policies 215 can, in certain embodiments, be customized for different users of the monitored system 210.

The event policies 217 can identify, for example, a list of desktop-administration events that are to be monitored for by the desktop-administration-event monitor 216. Each event of the event policies 217 can be identified, for example, by an event name, event ID, and/or the like.

The invocation policies 211 can identify, for example, for each of the monitored desktop-administration events, one or more script-execution processes (e.g., the script-execution processes 112) that should be invoked. In general, for a given desktop-administration event, the identified script-execution process executes a privilege-agnostic desktop-administration script that is designed to execute in coordination with the given desktop-administration event (e.g., drive mappings and printer assignments at logon). In various embodiments, each identified script-execution process can be identified by a name of the process's executable, a file location where the executable is stored, command-line parameters to invoke the process, combinations of the same, and/or the like.

The elevation policies 215 can specify, for example, a list of script-execution processes (e.g., some or all of the script-execution processes 112) that are designated for privilege elevation. In some cases, all script-execution processes on the list may be granted the same elevated privileges (e.g., administrative privileges). In other cases, the privileges granted are variable and can be specified accordingly in the elevation policies 215.

Although the event policies 217, the invocation policies 211, and the elevation policies 215 are illustrated separately, in various embodiments, these policies can be contained within a common set of policies. In addition, although the invocation module 214 and the desktop-administration-event monitor 216 are illustrated and described, the functionality described with respect to these components can be distributed among any number of one or more components or modules.

An example of privilege elevation will now be described with respect to the script-execution process 212. The script-execution process 212 typically executes one or more privilege-agnostic desktop-administration scripts. In certain embodiments, the security or access token 213 defines access rights of the script-execution process 212. Access rights can include administrative rights (e.g., local or remote) and non-administrative rights, among others. As described above, many desktop-administration tasks cannot be performed without administrative privileges or other elevated privileges. Thus, in certain implementations, the invocation module 214 can inject administrative or other elevated privileges into the security token 213 to allow the script-execution process 212. Consequently, according to this example, the script-execution process 212 can be invoked, in the user's desktop environment, as the user, and with the elevated privileges. In that way, the one or more privilege-agnostic desktop-administration scripts executed by the script-execution process 212 will likewise execute as the user, in the user's desktop environment, and with the elevated privileges.

In some embodiments, the security token 213 represents a new security token that is created with the administrative rights. In other embodiments, the security token 213 is an existing security token that is modified to include the administrative rights. If, for example, if the security token 213 (if one exists) has sufficient privileges (e.g., administrative privileges), the invocation module 214 can leave these rights unchanged. Examples of injecting the security token 213 with additional privileges such as administrative privileges are described in U.S. Pat. No. 8,650,578. U.S. Pat. No. 8,560,578 is hereby incorporated by reference. An example of operation of the administration service 234 will be described with respect to FIG. 3.

Figure 3:
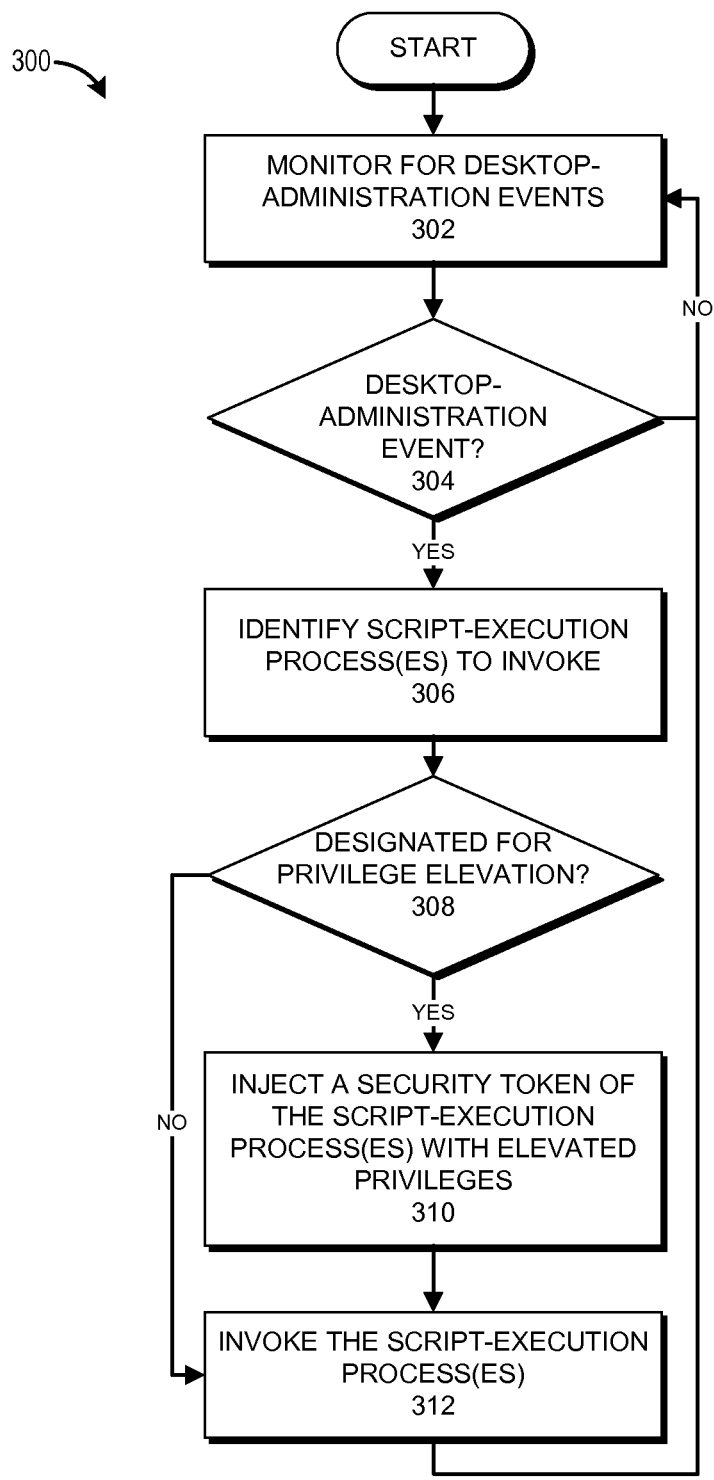
FIG. 3 illustrates an example of a process for elevating privileges of a privilege-agnostic desktop-administration script.

FIG. 3 presents a flowchart of an example of a process 300 for elevating privileges of a privilege-agnostic desktop-administration script. The process 300 can be implemented by any system that can access data, evaluate data, and/or interact with users. For example, the process 300, in whole or in part, can be implemented by one or more of the administration service 134, the invocation module 114, the desktop-administration-event monitor 116, one or more of the script-execution process 212, the administration service 234, the invocation module 214, the desktop-administration-event monitor 216, and/or the script-execution process 212. The process 300 can also be performed generally by the system 100, the monitored system 110, and/or the monitored system 210. Although any number of systems, in whole or in part, can implement the process 300, to simplify discussion, the process 300 will be described in relation to specific systems or subsystems of the system 100 and/or the monitored system 210.

At block 302, the desktop-administration-event monitor 216 monitors for desktop-administration events specified by the event policies 217. At decision block 304, the desktop-administration-event monitor 216 determines whether a desktop-administration event has occurred. If not, the process 300 returns to block 302 and proceeds as described above. Otherwise, if it is determined at the decision block 304 that a desktop-administration event has occurred, the process 300 proceeds to block 306.

At block 306, the invocation module 214 identifies one or more script-execution processes to invoke. In a typical embodiment, the invocation module 214 identifies the one or more script-execution processes from the invocation policies 211. For purposes of the example of FIG. 3, the one or more script-execution processes are represented by the script-execution process 212. At decision block 308, the invocation module 214 determines whether the script-execution process 212 is designated for privilege elevation. In a typical embodiment, the invocation module 214 determines whether the script-execution process 212 is designated for privilege elevation based on the elevation policies 215. If not, the process 300 proceeds directly to block 312 (described below). Otherwise, if it is determined at the decision block 308 that the script-execution process 212 is designated for privilege elevation, the process 300 proceeds to block 310. At block 310, the invocation module 214 injects the security token 213 with elevated privileges to yield a privilege-injected script-execution process.

At block 312, the invocation module invokes the script-execution process 212 in the desktop environment of the user. If the script-execution process is injected with elevated privileges at the block 310, the block 312 includes invoking the privilege-injected script-execution process. After block 312, the process 300 returns to block 302 and proceeds as described above. In various embodiments, the process 300 can continue until terminated by a user or administrator, a user logs off, or other stop criteria is met.

Advantageously, in certain embodiments, processes such as the process 300 of FIG. 3 can greatly streamline the writing of desktop-administration scripts. As described above, developers, administrators, and other users can write simplified desktop-administration scripts that are privilege agnostic. Although such scripts may perform desktop-administration tasks that require elevated privileges, the scripts themselves typically need not specify any manner of privilege elevation. Rather, elevation policies such as the elevation policies 215 can designate, for privilege elevation, a script-execution process that executes a particular privilege-agnostic desktop-administration script. In this fashion, the particular privilege-agnostic desktop-administration script can have elevated privileges automatically provided as described above.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, on an information handling system comprising computer hardware:
   monitoring a desktop environment of a user for a desktop-administration event, the desktop environment comprising a computer operating system;
   responsive to a detected occurrence of the desktop-administration event, identifying at least one script-execution process to invoke based, at least in part, on an invocation policy associated with the desktop-administration event;
   wherein the at least one script-execution process executes at least one privilege-agnostic desktop-administration script that modifies a configuration setting in the desktop environment, wherein the at least one privilege-agnostic desktop-administration script is written as if any given user in whose desktop environment the privilege-agnostic desktop-administration script is invoked has already been granted all necessary privileges;
   wherein the at least one privilege-agnostic desktop-administration script is designed to execute the modification to the configuration setting in response to the desktop-administration event;
   determining whether the at least one script-execution process is designated for automatic privilege elevation based, at least in part, on a stored elevation policy, wherein the stored elevation policy specifies script-execution processes that are designated for automatic privilege elevation;
   responsive to a determination that the at least one script-execution process is designated for automatic privilege elevation in the stored elevation policy, automatically injecting a security token of the at least one script-execution process with elevated privileges that are beyond what the user has been granted to yield a privilege-injected script-execution process; and
   invoking the privilege-injected script-execution process in the desktop environment so that the at least one privilege-agnostic desktop-administration script executes as the user with the elevated privileges.

2. The method of claim 1, wherein the injecting comprises modifying the at least one security token to include at least one additional right.

3. The method of claim 1, wherein the desktop-administration event comprises a logon event and the at least one privilege-agnostic desktop-administration script comprises a logon script.

4. The method of claim 1, wherein the at least one privilege-agnostic desktop-administration script modifies at least one configuration setting on the desktop environment.

5. The method of claim 4, wherein the at least one configuration setting is selected from the group consisting of: a security policy, a drive mapping, a startup application, a registry setting, a printer assignment, a folder redirection, Internet settings, a desktop shortcut, a proxy configuration, an application path, an application setting, and at least one profile.

6. The method of claim 1, wherein the elevated privileges comprise administrative privileges.

7. The method of claim 1, wherein the desktop environment comprises a virtual desktop environment.

8. An information handling system comprising:
a hardware computer processor and memory, wherein the hardware computer processor in combination with the memory is operable to:
monitor a desktop environment of a user for a desktop-administration event, the desktop environment comprising a computer operating system;
responsive to a detected occurrence of the desktop-administration event, identify at least one script-execution process to invoke based, at least in part, on an invocation policy associated with the desktop-administration event;
wherein the at least one script-execution process executes at least one privilege-agnostic desktop-administration script that modifies a configuration setting in the desktop environment, wherein the at least one privilege-agnostic desktop-administration script is written as if any given user in whose desktop environment the privilege-agnostic desktop-administration script is invoked has already been granted all necessary privileges;
wherein the at least one privilege-agnostic desktop-administration script is designed to execute the modification to the configuration setting in response to the desktop-administration event;
determine whether the at least one script-execution process is designated for automatic privilege elevation based, at least in part, on a stored elevation policy, wherein the stored elevation policy specifies script-execution processes that are designated for automatic privilege elevation;
responsive to a determination that the at least one script-execution process is designated for automatic privilege elevation in the stored elevation policy, automatically inject a security token of the at least one script-execution process with elevated privileges that are beyond what the user has been granted to yield a privilege-injected script-execution process; and
invoke the privilege-injected script-execution process in the desktop environment so that the at least one privilege-agnostic desktop-administration script executes as the user with the elevated privileges.

9. The information handling system of claim 8, wherein the injection comprises modifying the at least one security token to include at least one additional right.

10. The information handling system of claim 8, wherein the desktop-administration event comprises a logon event and the at least one privilege-agnostic desktop-administration script comprises a logon script.

11. The information handling system of claim 8, wherein the at least one privilege-agnostic desktop-administration script modifies at least one configuration setting on the desktop environment.

12. The information handling system of claim 11, wherein the at least one configuration setting is selected from the group consisting of: a security policy, a drive mapping, a startup application, a registry setting, a printer assignment, a folder redirection, Internet settings, a desktop shortcut, a proxy configuration, an application path, an application setting, and at least one profile.

13. The information handling system of claim 8, wherein the elevated privileges comprise administrative privileges.

14. The information handling system of claim 8, wherein the desktop environment comprises a virtual desktop environment.

15. A computer-program product comprising a non-transitory computer-usable medium having computer-readable program code embodied therein, the computer-readable program code adapted to be executed to implement a method comprising:
monitoring a desktop environment of a user for a desktop-administration event, the desktop environment comprising a computer operating system;
responsive to a detected occurrence of the desktop-administration event, identifying at least one script-execution process to invoke based, at least in part, on an invocation policy associated with the desktop-administration event;
wherein the at least one script-execution process executes at least one privilege-agnostic desktop-administration script that modifies a configuration setting in the desktop environment, wherein the at least one privilege-agnostic desktop-administration script is written as if any given user in whose desktop environment the privilege-agnostic desktop-administration script is invoked has already been granted all necessary privileges;
wherein the at least one privilege-agnostic desktop-administration script is designed to execute the modification to the configuration setting in response to the desktop-administration event;
determining whether the at least one script-execution process is designated for automatic privilege elevation based, at least in part, on a stored elevation policy, wherein the stored elevation policy specifies script-execution processes that are designated for automatic privilege elevation;
responsive to a determination that the at least one script-execution process is designated for automatic privilege elevation in the stored elevation policy, automatically injecting a security token of the at least one script-execution process with elevated privileges that are beyond what the user has been granted to yield a privilege-injected script-execution process; and
invoking the privilege-injected script-execution process in the desktop environment so that the at least one privilege-agnostic desktop-administration script executes as the user with the elevated privileges.

16. The computer-program product of claim 15, wherein the at least one privilege-agnostic desktop-administration script modifies at least one configuration setting selected from the group consisting of: a security policy, a drive mapping, a startup application, a registry setting, a printer assignment, a folder redirection, Internet settings, a desktop shortcut, a proxy configuration, an application path, an application setting, and at least one profile.

17. The computer-program product of claim 15, wherein the elevated privileges comprise administrative privileges.

* * * * *